US007061934B2

(12) United States Patent
El-Maleh et al.

(10) Patent No.: US 7,061,934 B2

(45) Date of Patent: *Jun. 13, 2006

(54) METHOD AND APPARATUS FOR INTEROPERABILITY BETWEEN VOICE TRANSMISSION SYSTEMS DURING SPEECH INACTIVITY

(75) Inventors: Khaled El-Maleh, San Diego, CA (US); Arasanipalai K. Ananthapadmanabhan, San Diego, CA (US); Andrew P. DeJaco, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 10/622,661

(22) Filed: Jul. 17, 2003

(65) Prior Publication Data

US 2004/0133419 A1 Jul. 8, 2004

Related U.S. Application Data

(63) Continuation of application No. 09/774,440, filed on Jan. 31, 2001, now Pat. No. 6,631,139.

(51) Int. Cl.
*H04J 3/16* (2006.01)
*H04J 3/22* (2006.01)

(52) U.S. Cl. ....................................... 370/466; 370/474

(58) Field of Classification Search ................ 370/466, 370/474, 528, 335, 342, 352; 709/200, 226, 709/205, 227, 233, 220

See application file for complete search history.

(56) References Cited

U.S. PATENT DOCUMENTS 5,868,662 A * 2/1999 Borodulin et al. .......... 600/105
6,182,035 B1 * 1/2001 Mekuria ..................... 704/236
6,269,331 B1 * 7/2001 Alanara et al. ............. 704/205
6,347,081 B1 * 2/2002 Bruhn ........................ 370/337

* cited by examiner

*Primary Examiner*—Huy D. Vu
*Assistant Examiner*—Daniel Ryman
(74) *Attorney, Agent, or Firm*—Kyong Macek

(57) ABSTRACT

The disclosed embodiments provide a method and apparatus for interoperability between CTX and DTX communications systems during transmissions of silence or background noise [FIG. 2]. Continuous eighth rate encoded noise frames are translated to discontinuous SID frames for transmission to DTX systems (402–410). Discontinuous SID frames are translated to continuous eighth rate encoded noise frames for decoding by a CTX system (602–606). Applications of CTX to DTX interoperability comprise CDMA and GSM interoperability (narrowband voice transmission systems), CDMA next generation vocoder (The Selectable Mode Vocoder) interoperability with the new ITU-T 4 kbps vocoder operating in DTX-mode for Voice Over IP applications, future voice transmission systems that have a common speech encoder/decoder but operate in differing CTX or DTX modes during speech non-activity, and CDMA wideband voice transmission system interoperability with other wideband voice transmission systems with common wideband vocoders but with different modes of operation (DTX or CTX) during voice non-activity.

4 Claims, 7 Drawing Sheets

METHOD AND APPARATUS FOR INTEROPERABILITY BETWEEN VOICE TRANSMISSION SYSTEMS DURING SPEECH INACTIVITY

RELATED APPLICATIONS

This application is a continuation of U.S. patent application Ser. No. 09/774,440 filed on Jan. 31, 2001 now U.S. Pat. No. 6,631,139.

BACKGROUND

1. Field

The disclosed embodiments relate to wireless communications. More particularly, the disclosed embodiments relate to a novel and improved method and apparatus for interoperability between dissimilar voice transmission systems during speech inactivity.

2. Background

Transmission of voice by digital techniques has become widespread, particularly in long distance and digital radio telephone applications. This, in turn, has created interest in determining the least amount of information that can be sent over a channel while maintaining the perceived quality of the reconstructed speech. If speech is transmitted by simply sampling and digitizing, a data rate on the order of sixty-four kilobits per second (kbps) is required to achieve a speech quality of conventional analog telephone. However, through the use of speech analysis, followed by the appropriate coding, transmission, and re-synthesis at the receiver, a significant reduction in the data rate can be achieved. Interoperability of such coding schemes for various types of speech is necessary for communications between different transmission systems. Active speech and non-active speech signals are fundamental types of generated signals. Active speech represents vocalization, while speech inactivity, or non-active speech, typically comprises silence and background noise.

Devices that employ techniques to compress speech by extracting parameters that relate to a model of human speech generation are called speech coders. A speech coder divides the incoming speech signal into blocks of time, or analysis frames. Hereinafter, the terms “frame” and “packet” are inter-changeable. Speech coders typically comprise an encoder and a decoder, or a codec. The encoder analyzes the. incoming speech frame to extract certain relevant gain and spectral parameters, and then, quantizes the parameters into binary representation, i.e., to a set of bits or a binary data packet. The data packets are transmitted over the communication channel to a receiver and a decoder. The decoder processes the data packets, de-quantizes them to produce the parameters, and then re-synthesizes the frames using the de-quantized parameters.

The function of the speech coder is to compress the digitized speech signal into a low-bit-rate signal by removing all of the natural redundancies inherent in speech. The digital compression is achieved by representing the input speech frame with a set of parameters and employing quantization to represent the parameters with a set of bits. If the input speech frame has a number of bits N and the data packet produced by the speech coder has a number of bits $N_o$, the compression factor achieved by the speech coder is $C_r=N_i/N_o$. The challenge is to retain high voice quality of the decoded speech while achieving the target compression factor. The performance of a speech coder depends on (1) how well the speech model, or the combination of the analysis, and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

Speech coders may be implemented as time-domain coders, which attempt to capture the time-domain speech waveform by employing high time-resolution processing to encode small segments of speech (typically 5 millisecond (ms) sub-frames) at a time. For each sub-frame, a high-precision representative from a codebook space is found by means of various search algorithms known in the art. Alternatively, speech coders may be implemented as frequency-domain coders, which attempt to capture the short-term speech spectrum of the input speech frame with a set of parameters (analysis) and employ a corresponding synthesis process to recreate the speech waveform from the spectral parameters. The parameter quantizer preserves the parameters by representing them with stored representations of code vectors in accordance with known quantization techniques described in A. Gersho & R. M. Gray, *Vector Quantization and Signal Compression* (1992). Different types of speech within a given transmission system may be coded using different implementations of speech coders, and different transmission systems may implement coding of given speech types differently.

For coding at lower bit rates, various methods of spectral, or frequency-domain, coding of speech have been developed, in which the speech signal is analyzed as a time-varying evolution of spectra. See, e.g., R. J. McAulay & T. F. Quatieri, *Sinusoidal Coding, in Speech Coding and Synthesis* ch. 4 (W. B. Kleijn & K. K. Paliwal eds., 1995). In spectral coders, the objective is to model, or predict, the short-term speech spectrum of each input frame of speech with a set of spectral parameters, rather than to precisely mimic the time-varying speech waveform. The spectral parameters are then encoded and an output frame of speech is created with the decoded parameters. The resulting synthesized speech does not match the original input speech waveform, but offers similar perceived quality. Examples of frequency-domain coders that are well known in the art include multiband excitation coders (MBEs), sinusoidal transform coders (STCs), and harmonic coders (HCs). Such frequency-domain coders offer a high-quality parametric model having a compact set of parameters that can be accurately quantized with the low number of bits available at low bit rates.

In wireless voice communication systems where lower bit rates are desired it is typically also desirable to reduce the level of transmitted power so as to reduce be co-channel interference and to prolong battery life of portable units. Reducing the overall transmitted data rate also serves to reduce the power level of transmitted data. A typical telephone conversation contains approximately 40 per cent speech bursts, and 60 percent silence and background acoustic noise. Background noise carries less perceptual information than speech. Because it is desirable to transmit silence and background noise at the lowest possible bit rate, using the active speech coding-rate during speech inactivity periods is inefficient.

A common approach for exploiting the low voice activity in conversational speech is to use a Voice Activity Detector. (VAD) unit that discriminates between voice and non-voice signals in order to transmit silence, or background noise at reduced data rates. However, coding schemes used by different types of transmission systems, such as Continuous Transmission (CTX) systems and Discontinuous Transmission (DTX) systems are not compatible during transmissions of silence or background noise. In a CTX system, data frames are continuously transmitted, even during periods of speech inactivity. When speech is not present in a DTX system, transmission is discontinued to reduce the overall transmission power. Discontinuous transmission for Global System for Mobile Communications (GSM) systems has been standardized in the European Telecommunications Standard Institute proposals to the International Telecommunications Union (ITU) entitled "Digital Cellular Telecommunication System (Phase 2+); Discontinuous Transmission (DTX) for Enhanced Full Rate (EFR) Speech Traffic Channels", and "Digital Cellular Telecommunication System (Phase 2+); Discontinuous Transmission (DTX) for Adaptive Multi-Rate (AMR) Speech Traffic Channels".

CTX systems require a continuous mode of transmission for system synchronization and channel quality monitoring. Thus, when speech is absent, a lower rate coding mode is used to continuously encode the background noise. Code Division Multiple Access (CDMA)-based systems use this approach for variable rate transmission of voice calls. In a CDMA system, eighth rate frames are transmitted during periods of non-activity. 800 bits per second (bps), or 16 bits in every 20 millisecond (ms) frame time, are used to transmit non-active speech. A CTX system, such as CDMA, transmits noise information during voice inactivity for listener comfort as well as synchronization and channel quality measurements. At the receiver side of a CTX communications system, ambient background noise is continuously present during periods of speech non-activity.

In DTX systems, it is not necessary to transmit bits in every 20 ms frame during non-activity. GSM, Wideband CDMA, Voice Over IP systems, and certain satellite systems are DTX systems. In such DTX systems, the transmitter is switched off during periods of speech non-activity. However, at the receiver side of DTX systems, no continuous signal is received during periods of speech non-activity, which causes background noise to be present during active speech, but disappear during periods of silence. The alternating presence and absence of background noise is annoying and objectionable to listeners. To fill the gaps between speech bursts, a synthetic noise known as "comfort noise", is generated at the receiver side using transmitted noise information. A periodic update of the noise statistics is transmitted using what are known as Silence Insertion Descriptor (SID) frames. Comfort Noise for GSM systems has been standardized in the European Telecommunications Standard Institute proposals to the International Telecommunications Union (ITU) entitled "Digital Cellular Telecommunication System (Phase 2+); Comfort Noise Aspects for Enhanced Full Rate (EFR) Speech Traffic Channels", and "Digital Cellular Telecommunication System (Phase 2+); Comfort Noise Aspects for Adaptive Multi-Rate (AMR) Speech Traffic Channels". Comfort noise especially improves listening quality at the receiver when the transmitter is located in noisy environments such as a street, a shopping mall, or a car, etc.

DTX systems compensate for the absence of continuously transmitted noise by generating synthetic comfort noise during periods of inactive speech at the receiver using a noise synthesis model. To generate synthetic comfort noise in DTX systems, one SD frame carrying noise information is transmitted periodically. A periodic DTX representative noise frame; or SID) frame, is typically transmitted once every 20 frame times when the VAD indicates silence.

A model common to both CTX and DTX systems for generating comfort noise at a decoder uses a spectral shaping filter. A random (white) excitation is multiplied by gains and shaped by a spectral shaping filter using received gain and spectral parameters to produce synthetic comfort noise. Excitation gains and spectral information representing spectral shaping are transmitted parameters. In CTX systems, the gain and spectral parameters are encoded at eighth rate and transmitted every frame. In DTX systems, SID frames containing averaged/quantized gain and spectral values are transmitted each period. These differences in coding and transmission schemes for comfort noise cause incompatibility between CTX and DTX transmission systems during periods of non-active speech. Thus, there is a need for interoperability between CTX and DTX voice communications systems that transmit non-voice information.

SUMMARY

Embodiments disclosed herein address the above-stated needs by facilitating interoperability between voice communications systems that transmit non-voice information between CTX and DTX communications systems. Accordingly, in one aspect of the invention, a method of providing interoperability between a continuous transmission communications system and a discontinuous transmission communications system during transmissions of non-active speech includes translating continuous non-active speech frames produced by the continuous transmission system to periodic Silence Insertion Descriptor frames decodable by the discontinuous transmission system, and translating periodic Silence Insertion Descriptor frames produced by the discontinuous transmission system to continuous non-active speech frames decodable by the continuous transmission system. In another aspect, a Continuous to Discontinuous Interface apparatus for providing interoperability between a continuous transmission communications system and a discontinuous transmission communications system during transmissions of non-active speech includes a continuous to discontinuous conversion unit for translating continuous non-active speech frames produced by the continuous transmission system to periodic Silence Insertion Descriptor frames decodable by the discontinuous transmission system, and a discontinuous to continuous conversion unit for translating periodic Silence Insertion Descriptor frames produced by the discontinuous transmission system to continuous non-active speech frames decodable by the continuous transmission system.

DETAILED DESCRIPTION

The disclosed embodiments provide a method and apparatus for interoperability between CTX and DTX communications systems during transmissions of silence or background noise. Continuous eighth rate encoded noise frames are translated to discontinuous SID frames, for transmission to DTX systems. Discontinuous SID frames are translated to continuous eighth rate encoded noise frames for decoding by a CTX system. Applications of CTX to DTX interoperability include CDMA and GSM interoperability (narrowband voice transmission systems), CDMA next generation vocoder (The Selectable Mode Vocoder) interoperability with the new ITU-T 4 kbps vocoder operating in DTX-mode for Voice Over IP applications, future voice transmission systems that have a common speech encoder/decoder but operate in differing CTX or DTX modes during non active speech, and CDMA wideband voice transmission system, interoperability with other wideband voice transmission systems with common wideband vocoders but with different modes of operation (DTX or CTX) during voice non-activity.

The disclosed embodiments thus provide a method and apparatus for an interface between the vocoder of a continuous voice transmission system and the vocoder of a discontinuous voice transmission system. The information bit stream of a CTX system is mapped to a DTX bit stream that can be transported in a DTX channel and then decoded by a decoder at the receiving end of the DTX system. Similarly, the interface translates the bit stream from a DTX channel to a CTX channel.

Figure 1:
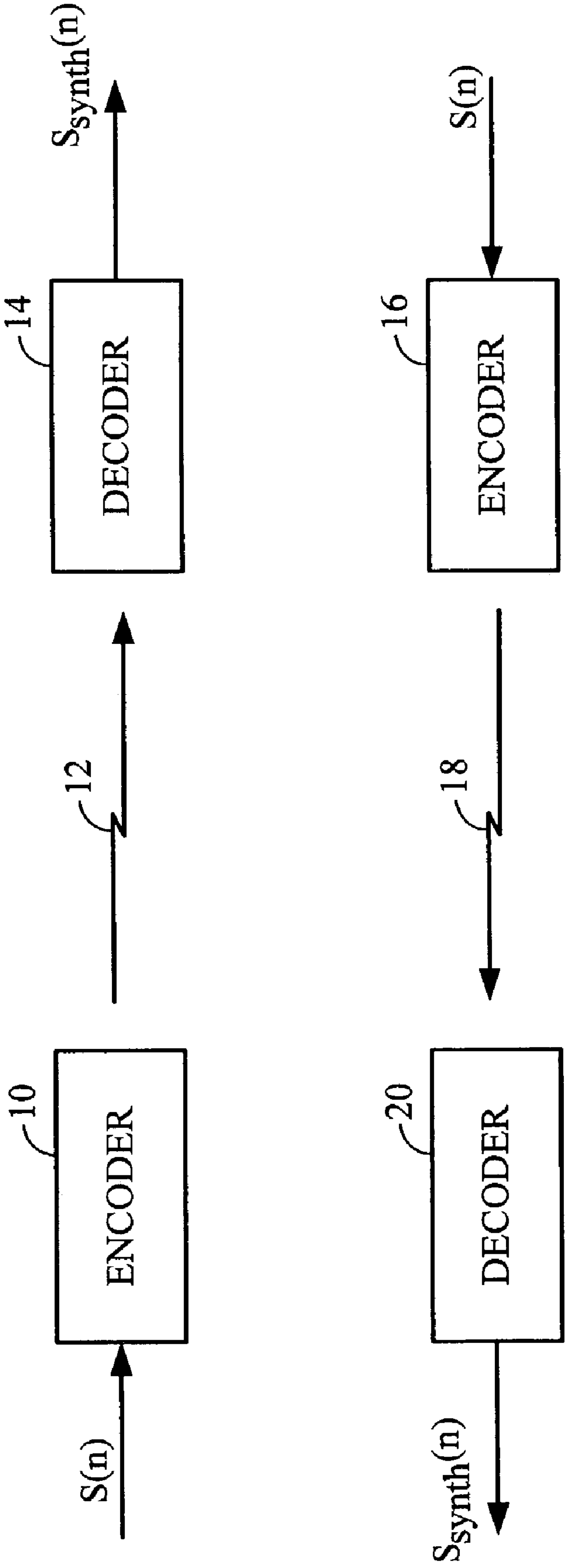
FIG. 1 is a block diagram of a communication channel terminated at each end by speech coders.

In FIG. 1 a first encoder 10 receives digitized speech samples s(n) and encodes, the samples s(n) for transmission on a transmission medium 12, or communication channel 12, to a first decoder 14. The decoder 14 decodes the encoded speech samples and synthesizes an output speech signal $s_{SYNTH}(n)$. For transmission in the opposite direction, a second encoder 16 encodes digitized speech samples s(n), which are transmitted on a communication channel 18. A second decoder 20 receives and decodes the encoded speech samples, generating a synthesized output speech signal $S_{SYNTH}(n)$.

The speech samples, s(n), represent speech signals that have been digitized and quantized in accordance with any of various methods known in the art including, e.g., pulse code modulation (PCM), companded μ-law, or A-law. As known in the art, the speech samples, s(n), are organized into frames of input data wherein each frame comprises a predetermined number of digitized speech samples s(n). In an exemplary embodiment, a sampling rate of 8 kHz is employed, with each 20 ms frame comprising 160 samples. In the embodiments described below, the rate of data transmission may be varied on a frame-to-frame basis from full rate to half rate to quarter rate to eighth rate. Alternatively, other data rates may be used. As used herein, the terms "full rate" or "high rate" generally refer to data rates that are greater than or equal to 8 kbps, and the terms "half rate" or "low rate" generally refer to data rates that are less than or equal to 4 kbps. Varying the data transmission rate is beneficial because lower bit rates may be selectively employed for frames containing relatively less speech information. As understood by those skilled in the art, other sampling rates, frame sizes, and data transmission rates may be used.

The first encoder 10 and the second decoder 26 together comprise a first speech coder, or speech codec. Similarly, the second encoder 16 and the first decoder 14 together comprise a second speech coder. It is understood by those of skill in the art that speech coders may be implemented with a digital signal processor (DSP), an application-specific integrated circuit (ASIC), discrete gate logic, firmware, or any conventional programmable software module and a microprocessor. The software module could reside in RAM memory, flash memory, registers, or any other form of writable storage medium known in the art. Alternatively, any conventional processor, controller, or state machine could be substituted for the microprocessor. Exemplary ASICs designed specifically for speech coding are described in U.S. Pat. No. 5,926,786, entitled APPLICATION SPECIFIC INTEGRATED CIRCUIT (ASIC) FOR PERFORMING RAPID SPEECH COMPRESSION IN A MOBILE TELEPHONE SYSTEM, assigned to the assignee of the presently disclosed embodiments and fully incorporated herein by reference, and U.S. Pat. No. 5,784,532, also entitled APPLICATION SPECIFIC INTEGRATED CIRCUIT (ASIC) FOR PERFORMING RAPID SPEECH COMPRESSION IN A MOBILE TELEPHONE SYSTEM, assigned to the assignee of the presently disclosed embodiments, and fully incorporated herein by reference.

Figure 2:
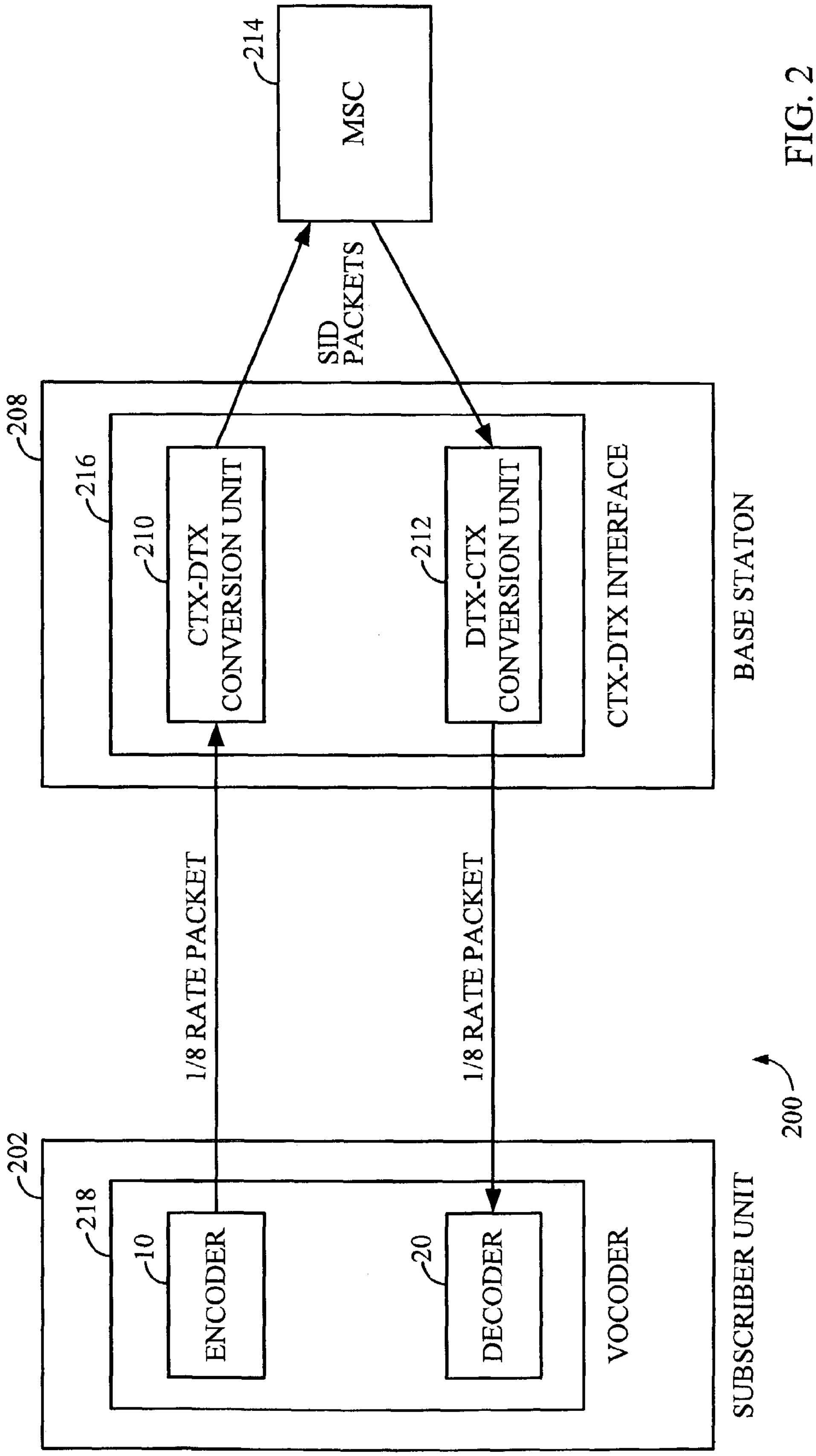
FIG. 2 is a block diagram of a wireless communication system, incorporating the encoders illustrated in FIG. 1, that supports CTX/DTX interoperability of non-voice speech transmissions.

FIG. 2 illustrates an exemplary embodiment of a wireless CTX voice transmission system 200 comprising a subscriber unit 202, a Base Station 208, and a Mobile Switching Center (MSC) 214 capable of interface to a DTX system during transmissions of silence or background noise. A subscriber unit 202 may comprise a cellular telephone for mobile subscribers, a cordless telephone, a paging device, a wireless local loop device, a personal digital assistant (PDA), an Internet telephony device, a component of a satellite communication system, or any other user terminal device of a communications system. The exemplary embodiment of FIG. 2 illustrates a CTX to DTX interface 216 between the vocoder, 218 of the continuous voice transmission system 200 and the vocoder of a discontinuous voice transmission system (not shown). The vocoders of both systems comprise an encoder 10 and a decoder 20 as described in FIG. 1. FIG. 2 illustrates an exemplary embodiment of a CTX-DTX interface implemented in the base station 208 of the wireless voice transmission system 200. In an alternative embodiment, the CTX-DTX interface 216 can be located in a gateway unit (not shown) to other voice transmission systems operating in DTX mode. However, it should be understood that the CTX-DTX interface components, or functionality thereof, may be physically located alternately throughout the systems without departing from the scope of the disclosed embodiments. The exemplary CTX to DTX Interface 216 comprises a CTX to DTX Conversion Unit 210 for translating eighth rate packets output from the encoder 10 of the subscriber unit 202 to DTX compatible SID packets, and a DTX to CTX Conversion Unit 212 for translating SID packets received from a DTX system to eighth rate packets decodable by the decoder 20 of the subscriber unit 202. The exemplary Conversion Units 210, 212 are equipped with encoder/decoder units of the interfacing voice system. The CTX to DTX Conversion Unit is descriptively detailed in FIG 4. The DTX to CTX Conversion Unit is descriptively detailed in FIG. 6. The decoder 20 of the exemplary Subscriber Unit 202 is equipped with a synthetic noise generator (not shown) for generating comfort noise from the eighth rate packets output by the DTX to CTX Conversion Unit 212. The synthetic noise generator is descriptively detailed in FIG. 3.

Figure 3:
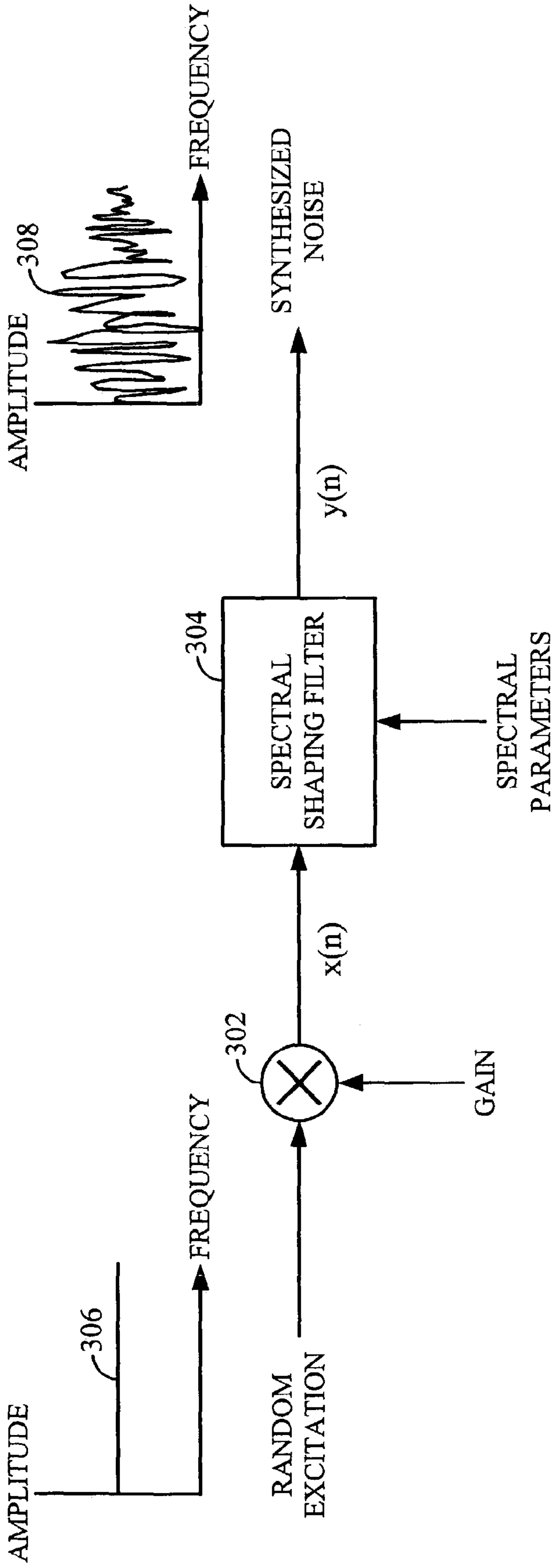
FIG. 3 is a block diagram of a synthetic noise generator for generating comfort noise at a receiver using transmitted noise information.

FIG. 3 illustrates an exemplary embodiment of a synthetic noise generator used by the decoders illustrated in FIGS. 1 and 2 10, 20 for generating comfort noise at a receiver with transmitted noise information. A common scheme to generate background noise in both CTX and DTX voice systems is to use a simple filter-excitation synthesis model. The limited low rate bits available for each frame are allocated to transmit spectral parameters and energy gain values that characterize background noise. In DTX systems interpolation of the transmitted noise parameters is used generate comfort noise.

A random excitation signal 306 is multiplied by the received gain in multiplier 302, producing an intermediate signal x(n), which represents a scaled random excitation. The scaled random excitation, x(n), is shaped by spectral shaping filter 304 using received spectral parameters, to produce a synthesized background noise signal 308, y(n). Implementation of the spectral shaping filter 304 would be readily understood by one skilled in the art.

Figure 4:
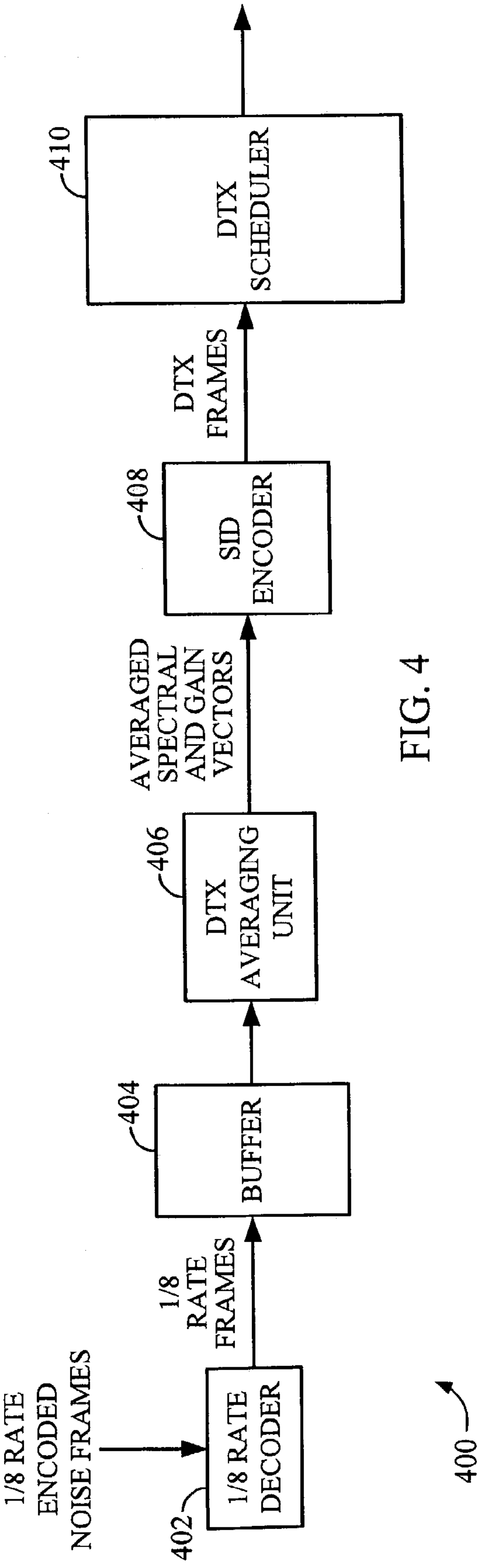
FIG. 4 is a block diagram of a CTX to DTX conversion unit.

FIG. 4 illustrates an exemplary embodiment of the CTX to DTX conversion unit 210 of the CTX to DTX Interface 216 illustrated in FIG. 2 216. Background noise is transmitted when a transmitting system's VAD outputs 0,indicating voice non-activity. When background noise is transmitted between two, CTX systems, a variable rate encoder produces continuous eighth rate data packets containing gain and spectral information, and a CTX decoder of the same system receives the eighth rate packets and decodes them to produce comfort noise. When silence or background noise is transmitted from a CTX system to a DTX system, interoperability must be provided by conversion of the continuous eighth rate packets produced by the CTX system to periodic, SID frames decodable by the DTX system. One exemplary embodiment in which interoperability must be provided between a CTX and a DTX system is during communications between two vocoders a new proposed vocoder for CDMA, the Selectable Mode Vocoder (SMV), and a new proposed 4 kbps International Telecommunications Union (ITU) vocoder using DTX mode of operation. The SMV vocoder uses three coding rates for active speech (8500, 4000,and 2000 bps) and 800 bps for coding silence and background noise. Both the SMV vocoder and the ITU-T vocoder have an interoperable 4000 bps active speech coding bit stream. For interoperability during speech activity, the SMV vocoder uses only the 4000 bps. coding-rate. However, the vocoders are not interoperable during speech non-activity because the ITU vocoder discontinues transmission during speech absence, and periodically generates SID frames containing background noise spectral and energy parameters that are only decodable at a DTX receiver. In a cycle of N noise frames, one SID packet is transmitted by the ITU-T vocoder to update noise statistics. The parameter, N, is determined by the SID frame cycle of the receiving DTX system.

Interoperability during transmission of inactive speech from a CTX system to a DTX system is provided by the CTX to DTX conversion unit 400 illustrated in FIG. 4. Eighth rate encoded noise frames are input to eighth rate decoder 402 from the encoder (not shown) of a CTX system (also not shown). In one embodiment, eighth rate decoder 402 can be a fully functional variable rate decoder. In another embodiment, eighth rate decoder 402 can be a partial decoder merely capable of extracting the gain and spectral information from an eighth rate packet. A partial decoder need only decode the spectral parameters and gain parameters of each frame necessary for averaging. It is not necessary for a partial decoder to be capable of reconstructing an entire signal. Eighth rate decoder 402 extracts the gain and spectral information from N eighth rate packets, which are stored in frame buffer 404. The parameter, N, is determined by the SID frame cycle of the receiving DTX system (not shown). DTX averaging unit 406 averages the gain and spectral information of N eighth rate frames for input to SID Encoder 408. SID Encoder 408 quantizes the averaged gain and spectral information, and produces a SID frame decodable by a DTX receiver. The SID, frame is input to DTX Scheduler 410, which transmits the packet at the appropriate time in the SID frame cycle of the DTX receiver. Interoperability during transmission of inactive speech from a CTX system to a DTX system is established in this manner.

Figure 5:
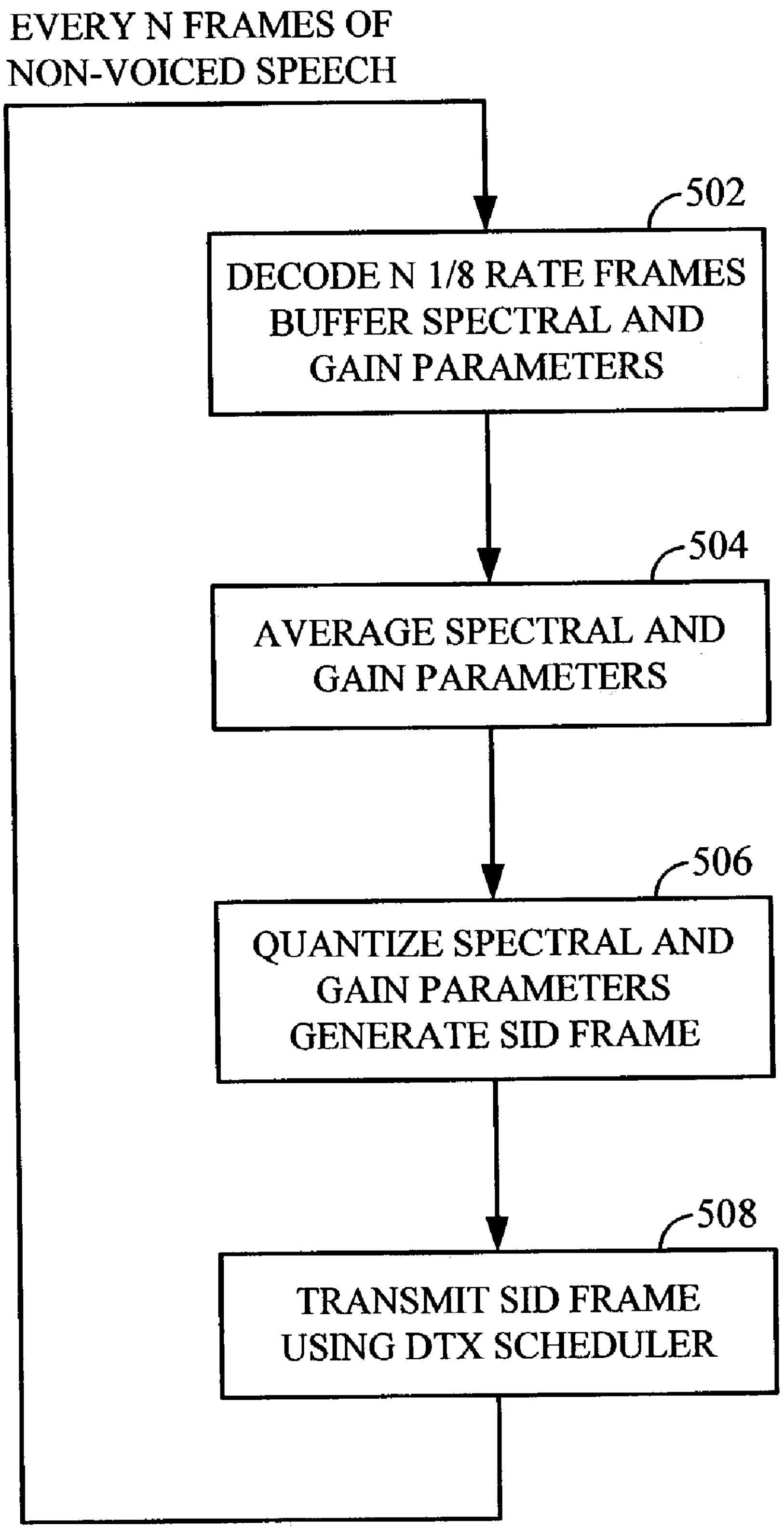
FIG. 5 is a flowchart illustrating conversion steps of CTX to DTX conversion.

FIG. 5 is a flowchart illustrating steps of CTX to DTX noise conversion in accordance with an exemplary embodiment. A CTX encoder producing eighth rate packets for conversion could be informed by a base station that the destination of the packets is a DTX system. In one embodiment, the MSC (FIG. 2 (214)) retains information about the destination system of the connection. MSC system registration identifies the destination of the connection and enables, at the Base Station (FIG. 2 (214)), the conversion of eighth rate packets to periodic SID frames which are, appropriately scheduled for periodic transmission compatible with the SID frame cycle of the destination DTX system.

CTX to DTX conversion produces SID packets that can be transported to a DTX system. During speech non-activity, the encoder of the CTX system transmits eighth rate packets to the decoder 402 of the CTX to DTX Conversion Unit 210.

Beginning in step 502, N continuous eighth rate noise frames are decoded to produce the spectral and energy gain parameters for the received packets. The spectral and energy gain parameters of the N consecutive eighth rate noise frames are buffered, and control flow proceeds to step 504.

In step 504, an average spectral parameter and an average energy gain, parameter representing noise in the N frames are computed using well known averaging techniques. Control flow proceeds to step 506.

In step 506, the averaged spectral and energy gain parameters are quantized, and a SID frame is produced from the quantized spectral and energy gain parameters. Control flow proceeds to step 508.

In step 508, the SID frame is transmitted by a DTX scheduler.

Steps 502–508 are repeated for every N eighth rate frames of silence or background noise. One skilled in the art will understand that ordering of steps illustrated in FIG. 5 is not limiting. The method is readily amended by omission or reordering of the steps illustrated without departing from the scope of the disclosed embodiments.

Figure 6:
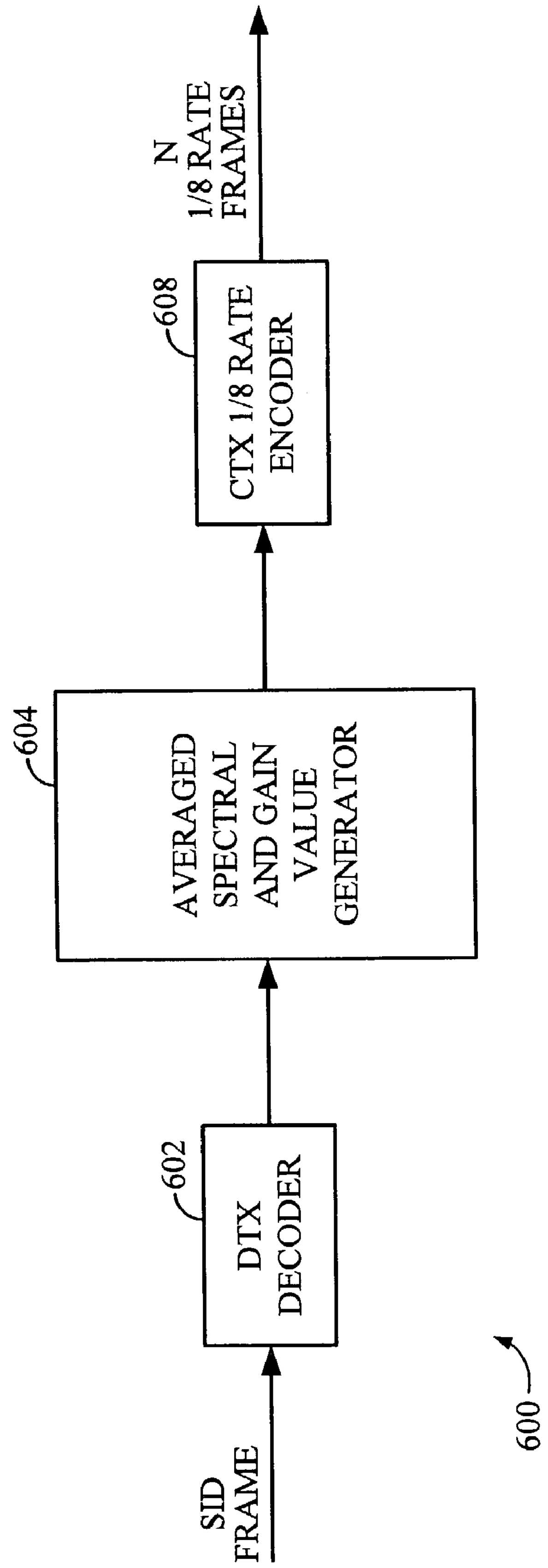
FIG. 6 is a block diagram of a DTX to CTX conversion unit.

FIG. 6 illustrates an exemplary embodiment of the DTX to CTX conversion unit 212 of the CTX to DTX Interface 216 illustrated in FIG. 2. When background noise is transmitted between two DTX systems, a DTX encoder produces periodic SID data packets containing averaged gain and spectral information, and a DTX decoder of the same system periodically receives the SID packets and decodes them to produce comfort noise. When background noise is transmitted from a DTX system to a CTX system, interoperability must be provided by conversion of the periodic SID frames produced by the DTX system to continuous eighth, rate packets decodable by the CTX system. Interoperability during transmission of inactive speech from a DTX system to a CTX system is provided by the exemplary DTX to CTX conversion unit 600 illustrated in FIG. 6.

SID encoded noise frames are input to DTX decoder 602 from the encoder of a DTX system (not shown). The DTX decoder 602 de-quantizes the SID packet to produce spectral and energy information for the SID noise frame. In one embodiment, DTX decoder 602 can be a fully functional DTX decoder. In another embodiment, DTX decoder 602 can be a partial decoder merely capable of extracting the averaged spectral vector and averaged gain from an SID packet. A partial DTX decoder need only decode the averaged spectral vector and averaged gain from SID packet. It is not necessary for a partial DTX decoder to be capable of reconstructing an entire signal. The averaged gain and spectral values are input to Averaged Spectral and Gain Vector Generator 604.

Averaged Spectral and Gain Vector Generator 604 generates N spectral values and N gain values from the one averaged spectral value and one averaged gain value extracted from the received SID packet. Using interpolation techniques, extrapolation techniques, repetition, and substitution, spectral parameters and energy gain values are calculated for the N un-transmitted noise frames. Use of interpolation techniques, extrapolation techniques, repetition, and substitution to generate the plurality of spectral values and gain values creates synthesized noised more representative of the original background noise than synthesized noise that is created with stationary vector schemes. If the transmitted SID packet represents actual silence, the spectral vectors are stationary, but with car noise, mall noise, etc., stationary vectors become insufficient. The N generated spectral and gain values are input to CTX eighth rate encoder 606, which produces N eighth rate packets. The CTX encoder outputs N consecutive eighth rate noise frames for each SID frame cycle.

Figure 7:
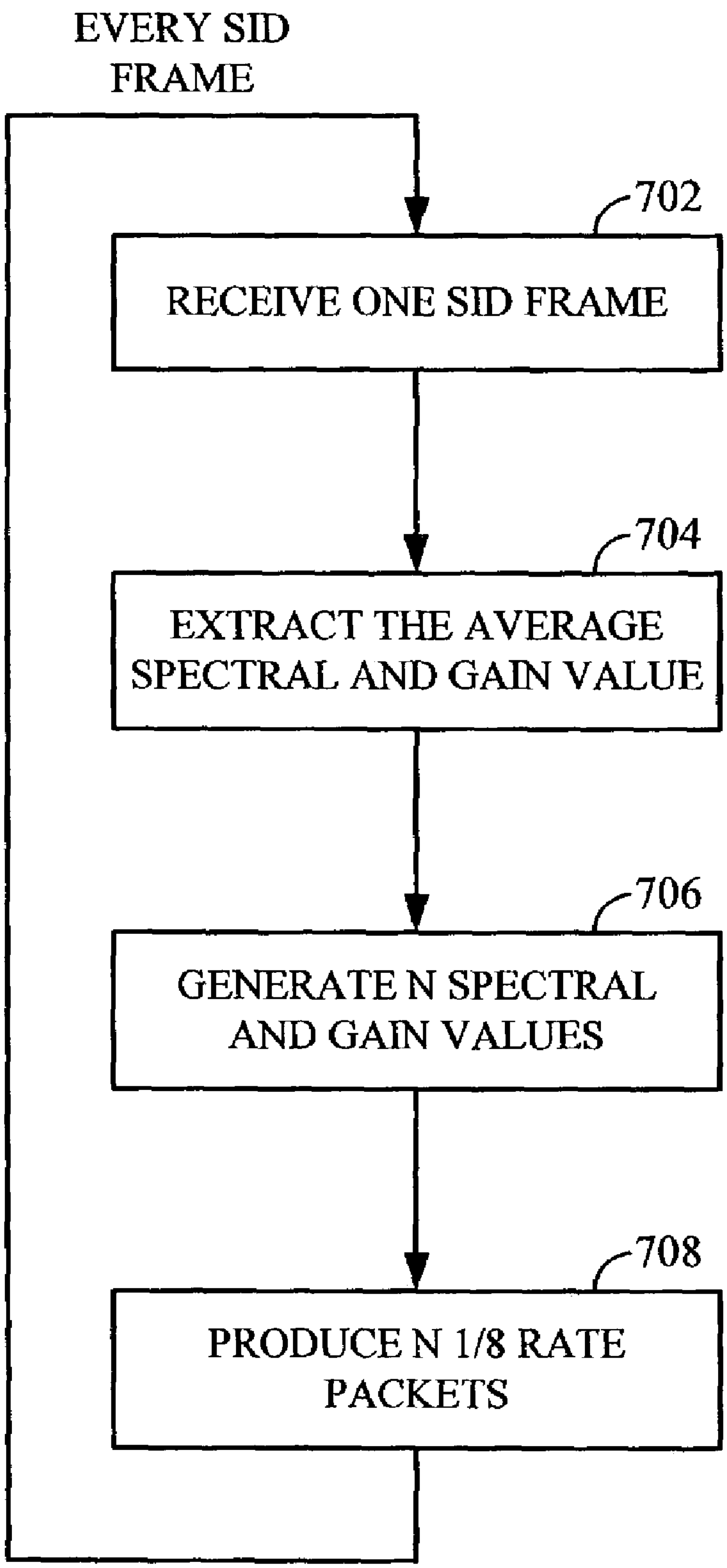
FIG. 7 is a flowchart illustrating conversion steps of DTX to CTX conversion.

FIG. 7 is a flowchart illustrating steps of DTX to CTX conversion in accordance with an exemplary embodiment. DTX to CTX conversion produces N eighth rate noise packets for each received SID packet. During speech non-activity, the encoder of the DTX system transmits periodic SID frames to the SID decoder 602 of the DTX to CTX Conversion Unit 212.

Beginning in step 702, a periodic SID frame is received. Control flow proceeds to step 704.

In step 704, the averaged gain values and averaged spectral values are extracted from the received SID packet. Control flow proceeds to step 706.

In step 706, N spectral values and N gain values are generated from the one averaged spectral value and one averaged gain value extracted from the received SID packet (and in one embodiment the next previous SI) packet) using any permutation of interpolation techniques, extrapolation techniques, repetition, and substitution. One embodiment of an interpolation formula used to generate N spectral values and N gain values in a cycle of N noise frames is:

$$p(n+i)=(1-i/N)p(n-N)+i/N^{*}p(n)$$

Where p(n+i) is the parameter of frame n+i (for i=0, 1, . . . , N−1), p(n) is the parameter of the first frame in the current cycle, and p(n-N) is the parameter for the first frame in the second most recent cycle. Control flow proceeds to step 708.

In step 708, N eighth rate noise packets are produced using the generated N spectral values and N gain values. Steps 702–708 are repeated for each received SID frame.

One skilled in the art will understand that ordering of steps illustrated in FIG. 7 is not limiting. The method is readily amended by omission or re-ordering of the steps illustrated without departing from the scope of the disclosed embodiments.

Thus, a novel and improved method and apparatus for interoperability between voice transmission systems during speech non-activity have been described. Those of skill in the art would understand that information an signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any; conventional processor, controller, microcontroller, or state machine. A processor may also be implemented as a combination of computing devices, e.g., a combination of a DSP and a microprocessor, a plurality of microprocessors, one or, more microprocessors in, conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other a form of storage medium known in the art. An exemplary storage medium is coupled to the processor such the processor can read information from, and write information to the storage medium. In the alternative, the storage medium may be integral to the processor. The processor and the storage medium may reside in an ASIC. The ASIC may reside in a subscriber unit. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for converting continuous non-active speech frames into discontinuous non-active speech frames, comprising:

extracting gain and spectral information from a plurality of continuous non-active speech frames;

averaging the gain and spectral information to attain an average gain parameter and an average spectral parameter; and generating at least one discontinuous non-active speech frame using the average gain parameter and the average spectral parameter.

2. A method for converting discontinuous non-active speech frames into continuous non-active speech frames, comprising:

extracting comfort noise information from a discontinuous non-active speech frame;

generating a plurality of spectral values and a plurality of gain values from the extracted comfort noise information; and generating a plurality of continuous non-active speech frames, each generated from one of the plurality of spectral values and one of the plurality of gain values.

3. Apparatus for converting continuous non-active speech frames into discontinuous non-active speech frames, comprising:

means for extracting gain and, spectral information from a plurality of continuous non-active speech frames;

means for averaging the gain and spectral information to attain an average gain parameter and an average spectral parameter; and means for generating at least one discontinuous non-active speech frame using the average gain parameter and the average spectral parameter.

4. Apparatus for converting discontinuous non-active speech frames into continuous non-active speech frames, comprising:

means for extracting comfort noise information from a discontinuous non-active speech frame;

means for generating a plurality of spectral values and a plurality of gain values from the extracted comfort noise information; and means for generating a plurality of continuous non-active speech frames, each generated from one of the plurality of spectral values and one of the plurality of gain values.

* * * * *